US006449498B1

(12) United States Patent
Kirbas et al.

(10) Patent No.: US 6,449,498 B1
(45) Date of Patent: Sep. 10, 2002

(54) METHOD AND SYSTEM FOR DYNAMICALLY UPDATING A BANNER FOR A COMMUNICATION DEVICE

(75) Inventors: Bilhan Kirbas, La Jolla; Samir K. Khazaka; Mazen Chmaytelli, both of San Diego, all of CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/379,807

(22) Filed: Aug. 23, 1999

(51) Int. Cl.[7] .................................................. H04B 1/38

(52) U.S. Cl. ....................................... 455/566; 345/169

(58) Field of Search ................................ 455/556, 557, 455/566; 345/350, 347, 169

(56) References Cited

U.S. PATENT DOCUMENTS

| | | | | |
|---|---|---|---|---|
| 5,790,974 A | * 8/1998 | Tognazzini | ................. | 701/204 |
| 5,797,089 A | * 8/1998 | Nguyen | ...................... | 455/403 |
| 5,873,108 A | * 2/1999 | Goyal | ........................ | 707/507 |
| 6,128,012 A | * 10/2000 | Seidensticker | .............. | 345/336 |
| 6,201,977 B1 | * 3/2001 | Cathey | ....................... | 455/574 |
| 6,208,879 B1 | * 3/2001 | Iwata | ......................... | 455/566 |

FOREIGN PATENT DOCUMENTS

| | | |
|---|---|---|
| FR | 8705448 | 4/1987 |

* cited by examiner

*Primary Examiner*—Daniel Hunter
*Assistant Examiner*—Nick Corsaro
(74) *Attorney, Agent, or Firm*—Philip R. Wadsworth; Charles D. Brown; Howard H. Seo

(57) ABSTRACT

A banner for a communication device that changes according to the current date is provided. The banner is displayed (13) during standby mode of operation of the communication device. The system for dynamically displaying the banner includes a calendar (21) which has a number of dates. Each of the number of dates has a unique message associated with it. The system also includes software (22*a*) that compares the current date with the number of dates from the calendar (21). The software (22*a*) then determines whether the current date matches one of the number of dates from the calendar (21). The display screen (23) of the communication device displays the unique message if the current date matches one of the number of dates from the calendar (21). If the current date does not match one of the number of dates from the calendar (21), the display screen (23) of the communication device displays a default message (14). The calendar (21) may be capable of being edited by a user of the communication device such that additional unique messages may be assigned to any date from the calendar (21). A communication service provider for the communication device may pre-determine the unique message to be displayed for each of the number of dates from the calendar (21).

21 Claims, 2 Drawing Sheets

METHOD AND SYSTEM FOR DYNAMICALLY UPDATING A BANNER FOR A COMMUNICATION DEVICE

FIELD OF THE INVENTION

The present invention relates generally to the field of communication devices. In particular, the present invention relates to a portable communication device having a dynamically updated banner.

BACKGROUND OF THE INVENTION

In portable communication devices such as, for example, cellular telephones, it is typical to display a message in the form of text on the display screen of the telephone. This text message is commonly known as a banner and is displayed by default in the standby mode during operation of the telephone. Although a banner is static in nature, it is capable of being manually edited by the user of the telephone at any time. The manual editing of the banner is typically accomplished by way of accessing a menu item from a list of menu items.

The act of accessing the menu item to edit the banner can become quite time consuming and burdensome to the user since it typically involves manually searching through a long list of menu items. Since banners are static and are not capable of being edited with ease, they usually only contain generic information which requires little or no editing by the user in the future. For this reason, banners have been used (often for the entire lifetime of the telephone), for example, merely to display the user's name. Having the user's name (or any message for that matter) continuously displayed as the banner, i.e. regardless of the date, tends to result in an inefficient use of the display screen during the standby mode. It is therefore desirable to provide a banner that not only displays meaningful information, but a banner that changes on a dynamic basis to thereby convey significant information relevant to the current date.

It is therefore an object of the present invention to provide a banner that displays updated and meaningful information on a dynamic basis.

It is a further object of the present invention to provide a banner that changes on a dynamic basis to thereby convey significant information relevant to the current date.

These and other objects and advantages of the invention will become more fully apparent from the description and claims which follow or may be learned by the practice of the invention.

SUMMARY OF THE INVENTION

The present invention is directed to a system and method for dynamically displaying a message corresponding to the current date on a display screen of a communication device during standby mode of operation of the communication device. The system includes a calendar having a plurality of dates. Each of the plurality of dates has a unique message associated therewith. The system also includes software that compares the current date with the plurality of dates from the calendar. The software then determines whether the current date matches one of the plurality of dates from the calendar. The display screen of the communication device displays the unique message if the current date matches one of the plurality of dates from the calendar. If the current date does not match one of the plurality of dates from the calendar, the display screen of the communication device displays a default message. The calendar may be capable of being edited by a user of the communication device such that additional unique messages may be assigned to any date from the calendar. Alternatively, a communication service provider for the communication device may pre-determine the unique message to be displayed for each of the plurality of dates.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DETAILED DESCRIPTION OF THE PREFERRED EMBODIMENT

Figure 1:
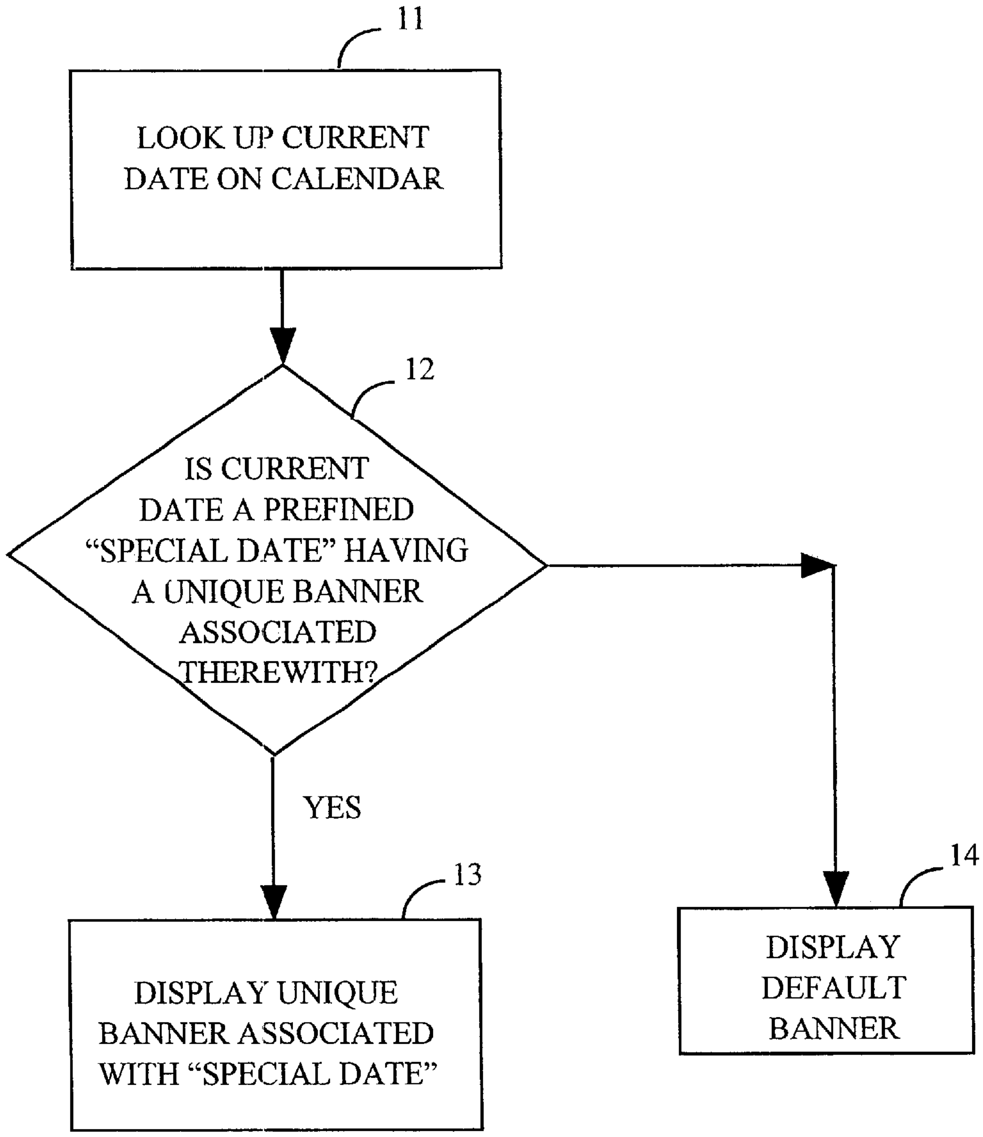
FIG. 1 is a simplified process flow diagram illustrating steps which may be performed for implementing a dynamically updated banner system, in accordance with a preferred embodiment of the present invention.

Reference will now be made to the drawings wherein like structures are provided with like reference designations. It will be understood that the drawings included herewith only provide diagrammatic representations of the presently preferred structures of the present invention and that structures falling within the scope of the present invention may include structures different than those shown in the drawings.

The dynamically updated banner system of the present invention is used to dynamically display a message corresponding to the current date on a display screen of a communication device during standby mode of operation of the communication device. In other words, the present invention is directed to a banner that dynamically changes according to the current date. The communication device is preferably a portable cellular telephone, but may be any communication device having data storage capabilities and a display screen such as, for example, a pager. It is to be understood that the displaying of unique messages mentioned hereinbelow is preferably performed during standby mode of operation of the communication device. To assist in describing the invention, "standby mode of operation" is defined as the period when the communication device is on but when the user of the communication device is not involved in active communication through the communication device.

Figure 2:
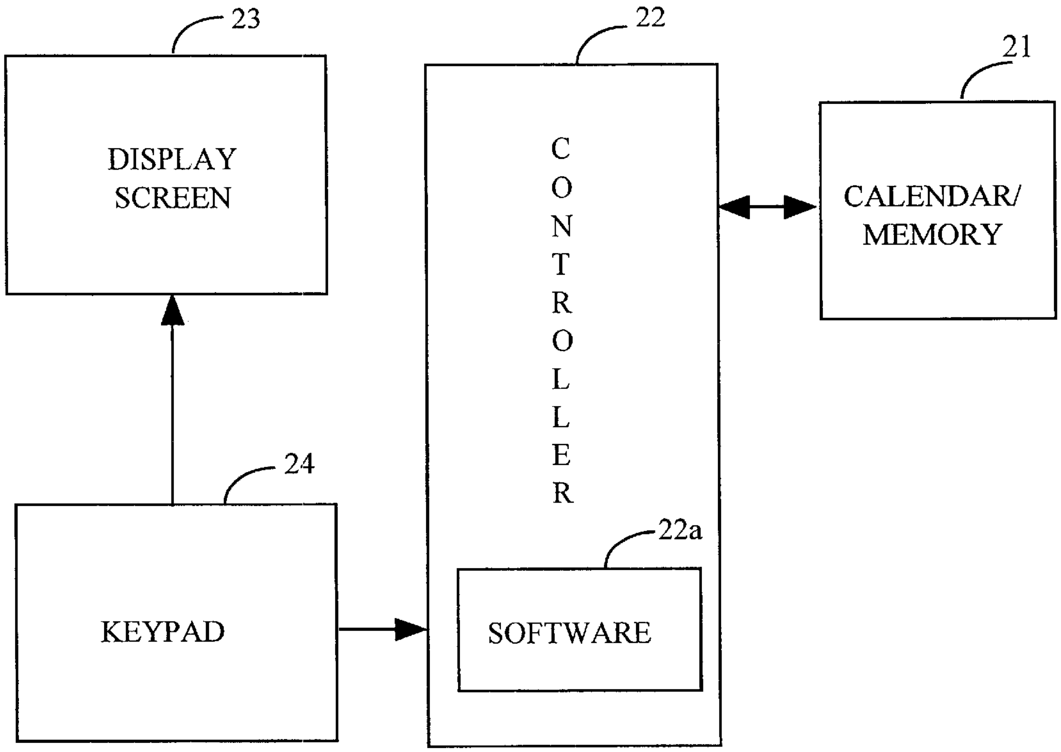
FIG. 2 is a hardware block diagram showing the components of a system for implementing the method of FIG. 1, in accordance with a preferred embodiment of the present invention.

Referring now to FIGS. 1 and 2, there are shown process flow and hardware block diagrams for implementing the dynamically updated banner system, in accordance with a preferred embodiment of the present invention. As explained more fully below, the process shown in FIG. 1 is preferably implemented in software **22*a* on controller 22 (shown in FIG. 2**).

In step 11 of the method for implementing the dynamically updated banner system, the current date is automatically accessed on a calendar 21 residing within the communication device through software 22*a* residing on controller 22. The calendar includes memory locations corresponding to a plurality of dates and is preferably a daily calendar. At least one of the dates from the plurality of dates has a unique message associated therewith. The dates that have a unique message associated therewith will be known hereinafter as "special dates".

In step 12, software 22a determines if the current date is a "special date" having a unique message associated therewith. This determination is made by a comparison of the current date with the plurality of dates within the calendar. The unique message includes a message other than the mere current calander date itself (i.e., Jul. 5, 1999 or Jul. 5, 1999), and may include text and/or be in the form of an image. Possible unique text messages that may appear on the communication device's display screen 23 are, for example, "Anniversary" or "Matthew's Birthday". An example of a possible image to be used as the unique message is a "heart shape" which may be used to quickly express the arrival of an anniversary. Thus, the unique messages that appear on the display screen 23 visually express to the user of the communication device the occurrence of some event, holiday, appointment, reminder, etc. Other messages may also be used. The use of other messages will of course fall within the skill level of those having ordinary skill in the art in light of the present invention. As per step 13, a unique message is only displayed on the display screen 23 of the communication device if the current date is a "special date".

The calendar is preferably stored with "special dates" having common unique messages such as "Thanksgiving", "Christmas", etc. which appear on the display screen 23 by default on the corresponding date. These common unique messages may be pre-programmed by the communication device's service provider. In a particularly preferred embodiment, software 22*a* also provides a user with the ability to edit or modify any of the unique messages stored in the device. In this embodiment, by accessing a menu item from a list of menu items via a keypad 24, the user of the communication device is able to edit or modify the preprogrammed calendar or delete/enter/edit other unique messages. The entering of other unique messages will create new "special dates" that will function the same as the preprogrammed "special dates" discussed above.

The calendar may alternatively be initially stored without any "special dates". Of course, the user of the communication device will then have the option to manually enter unique messages via keypad 24 to create new "special dates". As in the pre-programmed scenario above, the user of the communication device will then be able to edit or modify the calendar or be able to delete/enter other unique messages via the keypad.

In either scenario, if the current date does not match any "special date", then the display screen 23 will display a default or original message as per step 14. Like the unique messages, this default or original message may be pre-programmed by the communication device's service provider or alternatively, may be created by the user of the communication device. Either way, the user of the communication device will then be able to edit or modify this default or original message via the keypad 24.

In a still further embodiment, software 22*a* may also provide the user with the ability to disable the banner system shown in FIG. 1. For example, display 23 may include another menu item whose function is to disable the dynamic nature of the banner system expressed hereinabove if so desired by the user of the communication device. By selecting this option, the default or original banner will indefinitely be displayed until the menu option is deselected by the user of the communication device. Preferably, this "dynamic banner disabling" menu option is disabled by default.

The banner system as set forth above provides for an efficient use of the display screen during standby mode of operation of the communication device. This is accomplished by providing a banner that not only displays meaningful information, but a banner that changes on a dynamic basis to thereby convey significant information relevant to the current date.

Furthermore, it is to be understood that although the present invention has been described with reference to a preferred embodiment, various modifications, known to those skilled in the art, may be made to the structures and process steps presented herein without departing from the spirit and scope of the invention as set forth in the several claims appended hereto.

What is claimed is:

1. A method for dynamically displaying a message corresponding to the current date on a display screen of a wireless communication device during standby mode of operation of the communication device, said method comprising the steps of:

providing a calendar having a plurality of dates, each of the plurality of dates having a unique message associated therewith;

comparing the current date with the plurality of dates from the calendar;

determining whether the current date matches one of the plurality of dates from the calendar and whether the wireless communication device is in the standby mode;

displaying a unique message on the display screen of the communication device during the standby mode if the current date matches one of the plurality of dates from the calendar; and displaying a default banner if the current date does not match one of the plurality of dates from the calendar, wherein the unique message is a message different from the current date itself and the default banner.

2. The method of claim 1, further comprising the step of displaying a default message on the display screen of the communication device if the current date does not match one of the plurality of dates from the calendar.

3. The method of claim 1, further comprising the step of assigning a unique user-defined message to any date from the calendar.

4. The method of claim 1, further comprising the step of editing the unique message by a user of the communication device.

5. The method of claim 1, wherein the unique message for each of the plurality of dates from the calendar is predetermined by a communication service provider of the communication device.

6. The method of claim 5, further comprising the step of editing the unique message by a user of the communication device.

7. The method of claim 1, wherein the unique message is a text message.

8. The method of claim 1, wherein the unique message is in the form of an image.

9. The method of claim 1, wherein the communication device is a cellular telephone.

10. A system for dynamically displaying a message corresponding to the current date on a display screen of a wireless communication device during standby mode of operation of the communication device, said system comprising:

a calendar having a plurality of dates, each of the plurality of dates having a unique message associated therewith;

software that compares the current date with the plurality of dates from the calendar, and that determines whether the current date matches one of the plurality of dates from the calendar and whether the wireless communication device is in the standby mode; and a controller, responsive to the software, that displays the unique message on the display screen of the communication device during the standby mode if the current date matches one of the plurality of dates from the calendar and displays a default banner if the current date does not match one of the plurality of dates from the calendar;

wherein the unique message is a message different from the current date itself and the default banner.

11. The system of claim 10, wherein the display screen of the communication device displays a default message if the current date does not match one of the plurality of dates from the calendar.

12. The system of claim 10, wherein the calendar is capable of being edited by a user of the communication device such that additional unique messages may be assigned to any date from the calendar.

13. The system of claim 10, wherein the unique message for each of the plurality of dates is capable of being edited by a user of the communication device.

14. The system of claim 10, wherein the unique message for each of the plurality of dates is pre-determined by a communication service provider of the communication device.

15. The system of claim 14, wherein the unique message for each of the plurality of dates is capable of being edited by a user of the communication device.

16. The system of claim 10, wherein the unique message is a text message.

17. The system of claim 10, wherein the unique message is in the form of an image.

18. The system of claim 10, wherein the communication device is a cellular telephone.

19. The method of claim 10, wherein the unique message is "Anniversary".

20. The method of claim 10, wherein the unique message is "Thanksgiving".

21. A system for dynamically displaying a message corresponding to the current date on a display screen of a wireless communication device during standby mode of operation of the communication device, said system comprising:

means for providing a calendar having a plurality of dates, each of the plurality of dates having a unique message associated therewith;

means for comparing the current date with the plurality of dates from the calendar;

means for determining whether the current date matches one of the plurality of dates from the calendar and whether the wireless communication device is in the standby mode; and means for displaying a unique message on the display screen of the communication device during the standby mode if the current date matches one of the plurality of dates from the calendar and displaying a default banner if the current date does not match one of the plurality of dates from the calendar;

wherein the unique message is a message different from the current date itself and the default banner.

* * * * *